(12) United States Patent
Kremer et al.

(10) Patent No.: US 10,759,137 B2
(45) Date of Patent: Sep. 1, 2020

(54) MULTI-LAYERED PIPE AND A METHOD FOR FORMING A MULTI-LAYERED PIPE

(71) Applicant: Wavin B.V., Zwolle (NL)

(72) Inventors: Marinus Peter Kremer, Hardenberg (NL); Yogesh Sheshrao Deshmukh, Dedemsvaart (NL); Marco Goris, Hardenberg (NL); Johannes Akkerman, Haulerwijk (NL)

(73) Assignee: Wavin B.V., Zwolle (NL)

( * ) Notice: Subject to any disclaimer, the term of this patent is extended or adjusted under 35 U.S.C. 154(b) by 75 days.

(21) Appl. No.: 16/304,640

(22) PCT Filed: Jun. 1, 2017

(86) PCT No.: PCT/EP2017/063306
§ 371 (c)(1),
(2) Date: Nov. 26, 2018

(87) PCT Pub. No.: WO2017/207693
PCT Pub. Date: Dec. 7, 2017

(65) Prior Publication Data
US 2019/0168479 A1 Jun. 6, 2019

(30) Foreign Application Priority Data

Jun. 1, 2016 (NL) ...................................... 1041896
Nov. 29, 2016 (NL) ...................................... 1042164

(51) Int. Cl.
*B32B 1/08* (2006.01)
*B32B 7/06* (2019.01)
(Continued)

(52) U.S. Cl.
CPC .................. *B32B 1/08* (2013.01); *B32B 7/06* (2013.01); *B32B 27/08* (2013.01); *B32B 27/304* (2013.01);
(Continued)

(58) Field of Classification Search
CPC B32B 1/08; B32B 7/06; B32B 27/304; B32B 27/32; B32B 27/365; B32B 27/36;
(Continued)

(56) References Cited

U.S. PATENT DOCUMENTS 4,077,921 A 3/1978 Sharpe
5,016,675 A 5/1991 Igarashi et al.
(Continued)

FOREIGN PATENT DOCUMENTS

CN 101418886 A 4/2009
CN 101678632 A 3/2010
(Continued)

OTHER PUBLICATIONS

International Search Report and Written Opinion for International Application No. PCT/EP2017/063306, dated Aug. 23, 2017.
(Continued)

*Primary Examiner* — Michael C Miggins
(74) *Attorney, Agent, or Firm* — Wolf, Greenfield & Sacks, P.C.

(57) ABSTRACT

A multi-layered pipe comprising a wall having a polyolefin inner layer and a barrier layer being an outer layer relative to the polyolefin inner layer, the barrier layer being formed of a non-metallic barrier material, which barrier material has relative to polyolefin an enhanced resistance to permeation therethrough of hydrocarbon molecules, the pipe further comprising a protective layer being an outer layer relative to the barrier layer, the pipe further comprising a peelable layer between the polyolefin inner layer and the barrier layer, the peelable layer being formable around the polyolefin inner layer by means of extrusion. The protective layer and the barrier layer may together be incorporated in a single layer.

30 Claims, 3 Drawing Sheets

Figure 1:
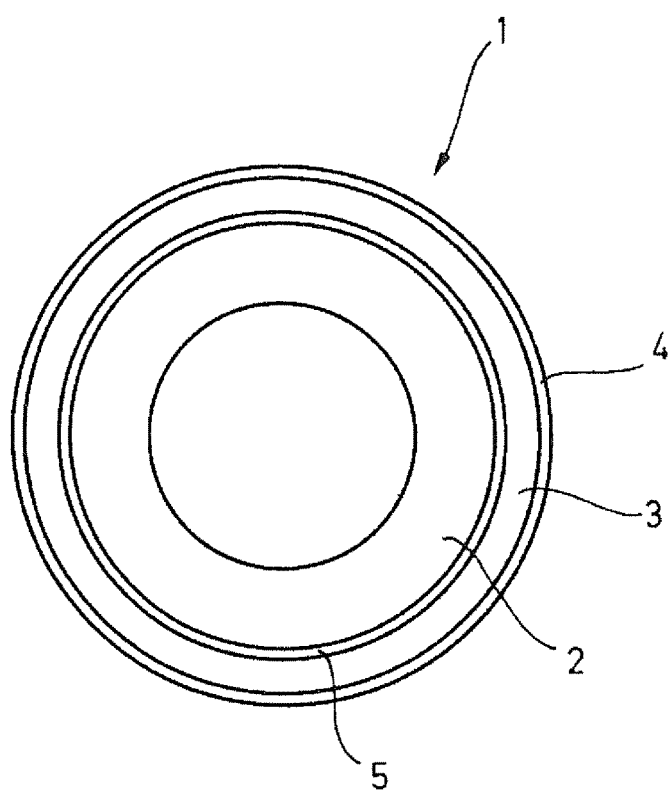

(51) Int. Cl.
*B32B 27/30* (2006.01)
*B32B 27/32* (2006.01)
*B32B 27/36* (2006.01)
*F16L 9/12* (2006.01)
*F16L 11/04* (2006.01)
*B32B 27/34* (2006.01)
*B32B 27/08* (2006.01)

(52) U.S. Cl.
CPC ............. *B32B 27/32* (2013.01); *B32B 27/34* (2013.01); *B32B 27/36* (2013.01); *B32B 27/365* (2013.01); *F16L 9/123* (2013.01); *F16L 11/045* (2013.01); *B32B 2250/24* (2013.01); *B32B 2307/7242* (2013.01); *B32B 2307/748* (2013.01); *B32B 2597/00* (2013.01); *F16L 2011/047* (2013.01)

(58) Field of Classification Search
CPC ....... B32B 27/34; B32B 27/08; B32B 27/225; B32B 27/24; B32B 2307/7242; B32B 2307/748; B32B 2597/00; F16L 9/123; F16L 11/045; F16L 2011/047
See application file for complete search history.

(56) References Cited

U.S. PATENT DOCUMENTS

| | | |
|---|---|---|
| 5,512,342 A | 4/1996 | Rober et al. |
| 6,179,008 B1 | 1/2001 | Kawazura et al. |
| 6,216,744 B1 | 4/2001 | Leray et al. |
| 7,281,547 B2 | 10/2007 | Cleveland et al. |
| 2001/0001395 A1 | 5/2001 | Shifman et al. |
| 2005/0170118 A1 | 8/2005 | Cleveland et al. |
| 2006/0011251 A1 | 1/2006 | Sato |
| 2006/0083884 A1 | 4/2006 | Cheng |
| 2010/0071796 A1 | 3/2010 | Ek et al. |
| 2010/0126617 A1 | 5/2010 | Stroempl et al. |
| 2011/0000572 A1 | 1/2011 | Ramaswamy et al. |
| 2011/0155359 A1 | 6/2011 | Doshi |
| 2011/0186170 A1 | 8/2011 | Oishi et al. |
| 2011/0226375 A1 | 9/2011 | Harris et al. |
| 2012/0021157 A1 | 1/2012 | Kawai et al. |
| 2013/0273286 A1 | 10/2013 | Luo et al. |
| 2015/0075666 A1 | 3/2015 | Clark et al. |
| 2018/0202583 A1 | 7/2018 | Rimal et al. |

FOREIGN PATENT DOCUMENTS

| | | |
|---|---|---|
| CN | 102947634 A | 2/2013 |
| CN | 103090126 A | 5/2013 |
| CN | 104093557 A | 10/2014 |
| CN | 104302702 A | 1/2015 |
| DE | 20 2014 100497 U1 | 2/2014 |
| EP | 0 638 749 A1 | 2/1995 |
| EP | 1 036 967 A1 | 9/2000 |
| EP | 2 851 190 A1 | 3/2015 |
| GB | 2 423 737 A1 | 9/2006 |
| JP | 2003-194265 A | 7/2003 |
| WO | WO 00/32974 A1 | 6/2000 |
| WO | WO 2005/103139 A1 | 11/2005 |
| WO | WO 2011/016747 A1 | 2/2011 |
| WO | WO 2013/154741 A2 | 10/2013 |
| WO | WO 2014/202554 A1 | 12/2014 |
| WO | WO 2015/007636 A1 | 1/2015 |
| WO | WO 2015/160771 A1 | 10/2015 |

OTHER PUBLICATIONS

International Preliminary Report on Patentability for International Application No. PCT/EP2017/063306, dated Dec. 13, 2018.
International Search Report and Written Opinion for International Application No. PCT/EP2016/065960, dated Aug. 2, 2016.
International Preliminary Report on Patentability for International Application No. PCT/EP2016/065960, dated Jan. 25, 2018.
International Search Report and Written Opinion for International Application No. PCT/EP2017/080841, dated Jan. 19, 2018.
Ch. II International Preliminary Report on Patentability for International Application No. PCT/EP2017/080841, dated Jan. 23, 2019.
First Office Action for Chinese Application No. 201680050039.1, dated Apr. 16, 2019.
Office Action for Georgian Application No. 14701/1, dated Feb. 18, 2019.

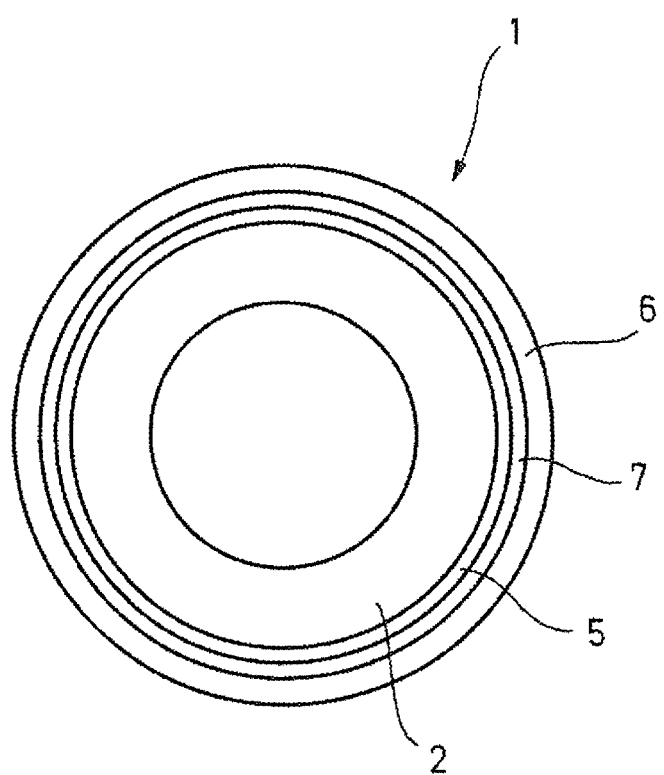

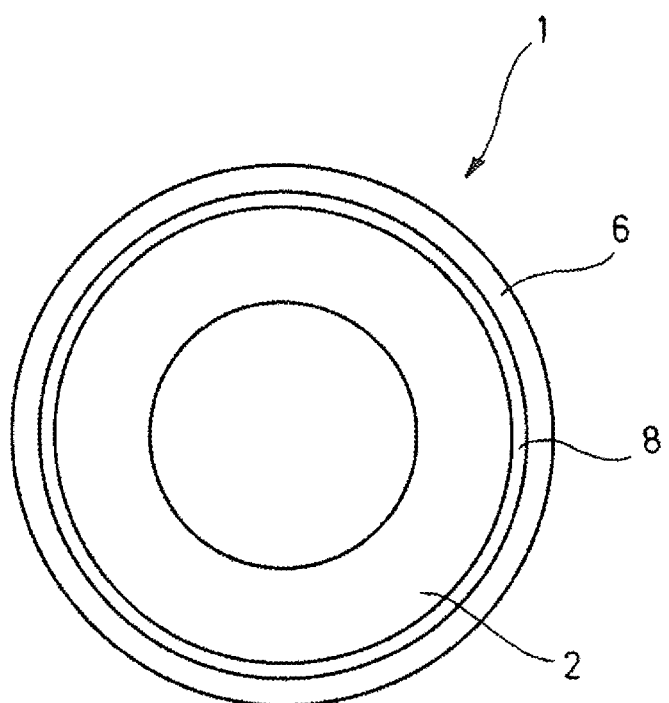

MULTI-LAYERED PIPE AND A METHOD FOR FORMING A MULTI-LAYERED PIPE

RELATED APPLICATIONS

This application is a national stage filing under 35 U.S.C. § 371 of international application number PCT/EP2017/063306, filed Jun. 1, 2017, and claims the benefit of Dutch application numbers 1041896, filed Jun. 1, 2016 and U.S. Pat. No. 1,042,164, filed Nov. 29, 2016, each of which is herein incorporated by reference in its entirety.

The invention relates to a multi-layered pipe as well as to a method for manufacturing the same. In particular, the invention relates to a multi-layered pipe to be used for transportation of drinking water.

Such pipes may need to be laid in contaminated ground (e.g. contaminated with oil, coal tar, petroleum, etc., that is, contaminated up to an extent that as yet no cleaning of the ground is required). For such a situation, there is a need to prevent ingress of hydrocarbon molecules through the wall of the pipe into the water supply.

EP 0638749 A1 proposed to use in the pipe wall a barrier layer made of polymers which have a very low permeability to hydrocarbons and to gases. The barrier layer is proposed as an outer layer onto an inner layer of polyolefin. One of these layers, or both, are disclosed to have adhesive polymer units derived from unsaturated epoxy or acyl compounds incorporated therein, in at least a region of an interface between the layers. The adhesive polymer units are present in a concentration effective to bond the polyolefin layer to the barrier layer.

A problem is that during laying a pipe scratches may be formed on the pipe, damaging the outer layer. For that reason the most outer layer is often not the barrier layer but an additional so-called protective layer.

DE 202014 100 497 U1 describes a pipe having a core pipe made of polyethylene, having a protective layer extruded onto the core pipe and a diffusion barrier layer between the core pipe and the protective layer. The diffusion layer is disclosed to be a multi-layered foil that is wound around the core pipe or that is placed as a number of longitudinal segments put next to each other, overlapping each other or abutting each other, in circumferential direction. The parts of multi-layered foil may be welded or glued against/to each other. The multi-layered foil may comprise in addition to the barrier layer a number of layers which improve the adhesion to other layers of the pipe. During production, first the core pipe is manufactured and provided, then the foil is placed as a layer onto the core pipe. Finally, the protective layer is extruded onto the multi-layered foil as put around the core pipe.

For joining pipes, particularly when inner core pipe material is of a polyolefin, it is important that during the welding the composition of the melt is the same as the composition of the inner core pipes which are to be joined. If the composition of the melt is different, then the joins will be inferior, possibly leading to a weakness, within or of the join, if not leading to a failure of the join. Pipe parts which are to be joined are preferably also free from dirt and/or oxidation, particularly when electrofusion fitting is used for joining the pipes. For this reason, the outer layers, i.e. the layers outside the inner core layer of polyolefin, are removed before welding, for instance, by electrofusion, takes place.

WO 2014/202554 A1 also proposes a multilayer barrier foil, having a barrier layer sandwiched between other polymer layers. The multi-layer foil can during manufacture of the pipe be wrapped around the pipe, and just before welding the pipe ends together the multi-layer foil can locally be removed from the pipe.

It is an object of the present invention to provide an alternative pipe for transporting drinking water through contaminated ground, ideally addressing at least one of the problems of the prior art.

It is another object of the invention to provide an alternative pipe for transporting drinking water through contaminated ground, having in addition to a barrier layer another feature for preventing hydrocarbon molecules from entering a polyolefin inner layer.

According to one aspect, the invention provides a multi-layered pipe according to claim 1. The multi-layered pipe comprises a wall having a polyolefin inner layer and a barrier layer being an outer layer relative to the polyolefin layer. The barrier layer is formed of a non-metallic barrier material, which barrier material has relative to polyolefin an enhanced resistance to diffusion therethrough of hydrocarbon molecules. The pipe further comprises a protective layer being an outer layer relative to the barrier layer. The pipe further comprises a peelable layer between the polyolefin inner layer and the barrier layer. The peelable layer is formable around the polyolefin inner layer by means of extrusion.

Accordingly, there is no need to first provide a pipe-shaped polyolefin inner layer, to then wrap around that inner layer a non-pipeshaped foil, or to put non-pipeshaped layers of foil around the polyolefin inner layer, to then finally produce other layers on top of the layer of foil. According to the invention, the entire pipe can be produced by co-extrusion, and thus no extra equipment for extruding a core-pipe, and possibly adding another layer by extrusion, is needed. This saves space for the footprints of all that equipment, saves logistics, saves storage space etc. Also production times may become significantly less. Furthermore, formation of oxidation on top of the pipeshaped polyolefin inner layer, and/or collection of dirt on the polyolefin inner layer, can be avoided as the peelable layer can be formed together with the polyolefin pipe. The pipe has preserved the conditions for being welded to another identical pipe without sacrificing functionality of further layers and without requiring fundamentally different techniques for adding the layers.

Furthermore, having a peelable layer between the barrier layer and the polyolefin inner layer provides for a discontinuation of a diffusion path, if available, for a hydrocarbon molecule which has found its way from outside the pipe into the pipe wall. If, as very unlikely, the hydrocarbon molecule ends up at a side of the barrier layer facing the peelable layer, and possibly still finds its way through the peelable layer, then by lack of material continuation, the hydrocarbon molecule may not diffuse further inwardly through the pipe wall. The hydrocarbon molecule may "get stuck" at the discontinuity, and not reach the drinking water.

According to another aspect of the invention there is provided a method wherein the method comprises use of at least one die producing multilayers.

According to another aspect of the present disclosure, it is an object of an additionally presented invention to provide an alternative pipe for transporting drinking water through contaminated ground, ideally addressing undesired complexity of prior art pipes. Such complexity may be presented by the number of layers of the pipe.

According to this aspect of the present disclosure, the additionally presented invention provides for a multi-layer pipe having a wall with a protective most outer layer which comprises PET. This has the advantage that it allows for a combination of a protective layer and a barrier layer, as will further be discussed below. Preferably, it also applies to embodiments of the additionally presented invention, that the pipe further has a barrier layer formed of a non-metallic barrier material, which barrier material has relative to polyolefin an enhanced resistance to permeation therethrough of hydrocarbon molecules.

In embodiments of the additionally presented invention, the barrier layer thus also comprises PET. Where in this aspect of the present disclosure reference is made to "comprising", it also embraces "made of". Having the protective most outer layer of PET and the barrier layer of PET reduces complexity of the multi-layer pipe.

In an embodiment of the additionally presented invention, the protective layer has a thickness which is in the range of 0.1 mm to 0.7 mm. Further, preferably, the barrier layer has a thickness which is in a range of 0.1 to 0.8 mm.

In a very preferred embodiment of the additionally presented invention, the protective layer and the barrier layer are together incorporated in a single layer. Preferably, the single layer has a thickness in a range of 0.2 to 1.5 mm.

Features of embodiments described above and below in relation to the other invention presented in this disclosure can easily be combined with features of the additionally presented invention in this disclosure. This will also be apparent from the numbered items presented towards the end of the more detailed description of embodiments and the drawing.

Embodiments of the invention and advantages thereof are further presented and discussed with reference to the drawing showing in:

FIG. 1: in cross-section a first embodiment of a pipe according to an embodiment of the invention; and FIG. 2: in cross-section a first embodiment of a pipe according to the additionally presented invention;

FIG. 3: in cross-section a second embodiment of a pipe according to the additionally presented invention.

In the drawing, like parts have like references. FIG. 1 shows schematically in cross-section a multi-layered pipe 1 comprising a wall having a polyolefin inner layer 2 and a barrier layer 3 being an outer layer relative to the polyolefin layer 2. The barrier layer 3 is formed of a non-metallic barrier material, which relative to polyolefin has an enhanced resistance to diffusion therethrough of hydrocarbon molecules. Such hydrocarbon molecules may include relatively small hydrocarbon molecules, and more particularly may include toluene trichloroethylene and P-dichlorobenzene. The pipe 1 further comprises a protective layer 4 being an outer layer 5 relative to the barrier layer 3. The protective layer and the barrier layer may together be incorporated in a single layer. It is advantageous when the protective layer and the barrier layer are of the same material. No tie layer is then needed between these layers. The two layers can be applied as a single layer.

The pipe further comprises a peelable layer 5 between the polyolefin inner layer 2 and the barrier layer 3. The peelable layer is formable around the polyolefin inner layer 2 by means of extrusion. Further down this description, a method of forming such a multi-layer pipe will be discussed.

The peelable layer 5 is sufficiently "bonded" to the polyolefin inner layer 2 to prevent relative movement between the peelable layer 5 and the inner layer 2. Such relative movement is prevented from occurring, particularly during normal use of the pipe, including transporting, laying and subjecting the pipe in the ground to "ground forces" as may statically and/or dynamically be exerted onto the pipe, possibly from different directions. Such normal use of the pipe does not include a deliberately attempting to remove the peelable layer 5 and any layers being outer layers relative to the peelable layer 5, by means of peeling.

The peelable layer is insufficiently bonded to prevent the peelable layer and therewith any layers being outer layers relative to the peelable layer, from removal by peeling. The peelable layer 5 may be adhering to the polyolefin inner layer, but most preferably no use is made of adhesives. Preferably, no chemical bonding is in place. Preferably, no material or adhesive is present between the peelable layer and the polyolefin inner layer.

The adhesive strength between the outer layers, i.e. all the layers other than the polyolefin inner layer 2, is preferably such that the force required to rupture the set of outer layers, is greater than the force required to peel the peelable layer 5 from the polyolefin inner layer 2. Removal of the peelable layer 5 and therewith any layers being outer layers relative to the peelable layer 5, by means of peeling, leaves a preferably clean outer surface of the polyolefin inner layer 2.

In this context, a clean surface is meant to be a pipe surface that can be subjected to welding and/or electrofusion jointing without further preparation or treatment. Such surfaces should be clean such the electrofusion joint formed meets the requirements of one or more of PREN12201 Part 3, PREN1555 Part 3 and WIS 04-32-14.

Peelability is a measurable property of a layer. Reference is made to, for instance, WO 2004/016976 A1, particularly Appendix 1 thereof. Peelability is usually assessed by determining the adhesion strength, using a rolling drum peel test as described on page 15 and 16 of this document. In short, using a knife, a cut is made from the most outer layer through subsequent layers up to and including the peelable layer 5. A strip of about 25 mm wide, i.e. 25 mm in longitudinal direction of the pipe, and about 30-40 mm in length is peeled off whilst remaining attached to the pipe. The free end of that strip is then clamped in jaws of a tensile testing machine. The peelable layer 5 and the outer layers relative to the peelable layer 5 are then peeled from the pipe at a separation rate of 100 mm/minute. The force needed is measured as a function of time. When the adhesion force as measured in such a way is between 0.1 and 0.8 newton/mm, then the layers to be peeled off are said to have a good peelability. The assessment of the adhesion force may be based on a number of tests, and applying straightforward stabilizing.

Good peelability means that the layers can be removed in the field manually and using a knife by removal of the peelable layer 5 (and therewith the outer layers relative to the peelable layer 5) as is required for welding the pipe ends together, either heads on, or by means of an additional pipe part that overlaps the pipe ends to be joined.

The welding and electrofusion techniques are well-known in the art.

The peelable layer 5 may comprise one of polyethylene (PE), polypropylene (PP), polycarbonate (PC), polystyrene (PS), polyamide (PA), polyvinylchloride (PVC), polybutylene (PB). Preferably, the peelable layer 5 comprises a propylene copolymer, preferably a propylene block copolymer. This material is suitable for extrusion. Frequently used PP grade has an MFR of approximately 0.3 gr/10 min and an Emod of 1300 MPa, i.e. good properties for its function.

The peelable layer 5 may comprise an adhesive for bonding the respective peelable layer against the barrier layer 3. If the peelable layer is too thin, it is more difficult to peel the external layer. The peelable layer 5 may have a thickness which is equal to or more than 0.4 mm, and more preferably equal to or more than 0.7 mm.

The polyolefin inner layer 2 is preferably of polyethylene (PE). PE is widely used for drinkwater pressue application.

The barrier layer 3 is ideally free from EVOH and/or free from polyamide (PA), as these are too hydrophilic. Permeation is often seen to consist of three processes, namely 1) absorption of the permeating molecules (in gaseous or vaporous state) into the material (here into the polymer); 2) diffusion through the polymer; and 3) description of the permeating molecules from the polymer surface. A quantity that provides measurable characteristics of the permeation is the permeation coefficient, which is defined as the diffusion coefficient multiplied by the partition coefficient (the latter quantity being a measure of the solubility of small molecules in a polymer). Ideally, the barrier layer 3 comprises plastic material that has at 20° C. a permeability coefficient equal to or smaller than $1\times10^{-15}$ $m^2 \cdot s^{-1}$. Preferably, the barrier layer 3 comprises at least one of polyethylene terephthalate (PET), amorphous polyethylene terephthalate (APET), PET (crystalline PET), polybutylene terephthalate (PBT), polyethylene naphthalate (PEN) and/or polyethylene furanoate (PEF). The barrier layer 3 may have a thickness which is equal to or more than 0.4 mm, preferably equal to or more than 0.6 mm, even more preferably equal to or more than 0.8 mm. A thicker barrier layer will provide a longer path for molecules to reach the other side of the layer, and therefore better barrier properties. A barrier layer comprising PET may have a thickness which is in a range of 0.1 mm to 0.8 mm.

The protective layer 4 may comprise at least one of polyethylene (PE), polypropylene (PP), polycarbonate (PC), polystyrene (PS), polyamide (PA), polyvinylchloride (PVC), polybutylene (PB). The protective layer 4 may have a thickness which is equal to or more than 0.4 mm, more preferably equal to or more than 0.7 mm. A thick layer provides more certainty that damaging the barrier layer will be avoided. The protective layer 4 may comprise an adhesive for bonding the protective layer 5 against the barrier layer 3. Alternatively, or additionally, between the protective layer 5 and the barrier layer 3 a tie layer of the first type (not shown) may be situated for bonding the protective layer 5 against the barrier layer 3. Such a tie layer of the first type may have a thickness of about 0.1 mm. The tie layer of the first type may be composed of maleic anhydride grafted polymer.

The protective layer may also comprise PET and may then have a thickness in a range of 0.1 mm to 0.7 mm. If the barrier layer equally comprises PET, then the protective layer and the barrier layer may together be incorporated in a single layer. The single layer may then have a thickness in the range of 0.2 to 1.5 mm.

Between the peelable layer 5 and the barrier layer 3 a tie layer of a second type (not shown) may be situated for bonding the peelable layer 5 against the barrier layer 3. The tie layer of the second type may equally have a thickness of about 0.1 mm. The tie layer of the second type may be composed of maleic anhydride grafted polymer.

Clearly, a multilayer pipe may comprise 4, 5 or 6 layers which are each of a different material as compared to the material of each directly adjacently situated layer. Preferably the multilayer pipe has been formed by coextrusion of its layers. The polymeric materials may be brought together in a pressure area of an extrusion die and exit as a single extrudable. For example, the extrusion die may be connected to 1, 2, 3 or more extruders and fed with separate streams of multimaterial. Alternatively, the die may be provided with concentric die outlets fed with separate streams of multipolymeric materials which are to form the inner core and the various outer layers. In this technique, the extrudables on leaving the extruder die outlets, can be brought into contact with each other while still molten, preferably in a sizing die which simultaneously adjusts the outer diameters of the pipe. In an alternative, the inner core extrudable, in this case of polyolefin, may be passed through a sizing die before applying the peelable layer and further outer layers. In this case it may be necessary to reheat or flame burst the surface of the inner core extradite to create a surface ready to receive the peelable layer and the various outer layers. Because of the difficulty of maintaining a consistent adhesion between the inner polyolefin layer and the peelable layer and further outer layers, and of keeping the outer surface of the polyolefin inner layer clean (prior to applying the peelable layer and the further outer layers), this method is not presently preferred.

Alternatively, the method comprises use of the first die producing two layers and the second die oriented under an angle with respect to the two layers produced by the first die. It is also possible that the method comprises use of the first die producing two layers and a number of second dies which are each oriented under an angle with respect to the two layers produced by the first die.

FIG. 2 shows schematically in cross-section a multi-layered pipe 1 having as a most outer layer a protective layer which comprises PET. The multi-layered pipe 1 also has a barrier layer, which equally comprises PET. The protective layer and the barrier layer are together incorporated in a single layer 6. Between the single layer 6 and the peelable layer 5, in this example of PB, there is a tie layer 7.

FIG. 3 shows schematically in cross section a multi-layered pipe 1 having a single layer 6, a peelable tie layer 8 and a polyolefin inner layer.

The following list of numbered paragraphs provide further disclosure of the additionally presented invention.

The following numbered paragraphs provide further disclosure of the present subject matter.

1. A multi-layered pipe having a wall with a protective most outer layer which comprises PET.
2. A multi-layered pipe according to para. 1, further having a barrier layer formed of a non-metallic barrier material, which barrier material has relative to polyolefin an enhanced resistance to permeation therethrough of hydrocarbon molecules.
3. A multi-layered pipe according to para. 1 or 2, wherein the barrier layer comprises PET.
4. A multi-layered pipe according any one of the previous paras., wherein the protective layer has a thickness which is in a range of 0.1 mm to 0.7 mm.
5. A multi-layered pipe according any one of the previous paras., wherein the barrier layer has a thickness which is in a range of 0.1 to 0.8 mm.
6. A multi-layered pipe according to any one of the previous paras., wherein the protective layer and the barrier layer are together incorporated in a single layer.
7. A multi-layered pipe according to para. 6, wherein the single layer has a thickness in the range of 0.2 to 1.5 mm.
8. A multi-layered pipe according to any one of the previous paras., wherein the wall has a polyolefin most inner layer.
9. A multi-layered pipe according to at least para. 2 and para. 8, wherein the pipe further comprises a peelable layer between the polyolefin most inner layer and the barrier layer.

10 A multi-layered pipe according to para. 9, wherein the peelable layer is formable around the polyolefin inner layer by means of extrusion.

11 A multi-layered pipe according to para. 9 or 10, wherein the peelable layer is a peelable tie layer of PE.

12 A pipe according to para. 2, wherein between the protective layer and the barrier layer a tie layer of a first type is situated for bonding the protective layer against the barrier layer.

13 A pipe according to at least para. 2 and 8, wherein between the peelable layer and the barrier layer a tie layer of a second type is situated for bonding the peelable layer against the barrier layer.

14 A pipe according to paras. 12 and/or 13, wherein the tie layer of the first type and/or of the second type has a thickness of about 0.1 mm.

15 A pipe according to any one of paras. 2-14, wherein the barrier layer is free from EVOH and/or free from polyamide (PA).

16 A pipe according to any one of paras. 2-15, wherein the barrier layer comprises a plastic material that has at 20° C. a permeation coefficient equal to or smaller than $1 \times 10^{-15}$ $m^2 \cdot s^{-1}$ 17 A pipe according to at least para. 2, wherein the barrier layer comprises at least one of polyethylene terephthalate (PET), amorphous polyethylene terephthalate (APET), polybutylene terephthalate (PBT), polyethylene naphthalate (PEN) and polyethylene furanoate (PEF).

18 A pipe according to any one of paras. 9-17, wherein the peelable layer comprises at least one of polyethylene (PE), polypropylene (PP), polycarbonate (PC), polystyrene (PS), polyamide (PA), polyvinylchloride (PVC), polybutylene (PB).

19 A pipe according to anyone of the previous paras., wherein the multi-layered pipe has been formed by co-extrusion of its layers.

20 A pipe according to any one of the previous paras., wherein the multilayer pipe comprises 3, 4, 5 or 6 layers which are each of a different material as compared to the material of each directly adjacently situated layer.

21 A pipe according to any one of the previous paras. 9-20, wherein the peelable layer has a thickness which is equal to or more than 0.1 mm, preferably equal to or more than 0.4 mm, even more preferably equal to or more than 0.7 mm.

22 A pipe according to any one of the previous paras., wherein the most inner layer is of polyethylene (PE).

23 A pipe according to any one of the previous paras. 9-22, wherein the peelable layer is sufficiently bonded to the inner layer to prevent relative movement between the peelable layer and the inner layer, and is insufficiently bonded to prevent removal of the peelable layer and therewith any layers being outer layers relative to the peelable layer, from removal by peeling.

24 A pipe according to any one of the previous paras. 9-23, wherein the peelable layer is at least at the side facing the polyolefin inner layer free from any adhesives.

25 A pipe according to any one of the previous paras. 9-24, wherein no material or adhesive is present between the peelable layer and the polyolefin inner layer.

26 A pipe according to any one of the previous paras. 9-25, wherein the peelable layer comprises a propylene co-polymer, preferably a propylene block co-polymer.

27 A method for forming a multi-layered pipe according to any one of paras. 1-26, the method comprising co-extrusion of the layers.

28 A method according to para. 27, wherein the method comprises use of at least one die producing multilayers.

29 A method according to para. 27 or 28, wherein the method comprises use of a first die producing two layers and a second die oriented under an angle with respect to the two layers produced by the first die.

30 A method according to para. 27, 28 or 29, wherein the method comprises use of a first die producing two layers and a number of second dies which are each oriented under an angle with respect to the two layers produced by the first die.

The invention claimed is:

1. A multi-layered pipe comprising a wall having a polyolefin inner layer and a barrier layer being an outer layer relative to the polyolefin inner layer, the barrier layer being formed of a non-metallic barrier material, which barrier material has relative to polyolefin an enhanced resistance to permeation therethrough of hydrocarbon molecules, the pipe further comprising a protective layer being an outer layer relative to the barrier layer, the pipe further comprising a peelable layer between the polyolefin inner layer and the barrier layer, the peelable layer being formable around the polyolefin inner layer by means of extrusion.

2. The pipe according to claim 1, wherein at least one of the protective and the peelable layer comprises an adhesive for bonding the respective protective and/or peelable layer against the barrier layer.

3. The pipe according to claim 1, wherein the barrier layer is free from EVOH and/or free from polyamide (PA).

4. The pipe according to claim 1, wherein the barrier layer comprises a plastic material that has at 20° C. a permeation coefficient equal to or smaller than $1 \times 10^{-15}$ $m^2 \cdot s^{-1}$.

5. The pipe according to claim 1, wherein the barrier layer comprises at least one of polyethylene terephthalate (PET), amorphous polyethylene terephthalate (APET), polybutylene terephthalate (PBT), polyethylene naphthalate (PEN) and polyethylene furanoate (PEF).

6. The pipe according to claim 1, wherein the peelable layer comprises at least one of polyethylene (PE), polypropylene (PP), polycarbonate (PC), polystyrene (PS), polyamide (PA), polyvinylchloride (PVC), polybutylene (PB).

7. The pipe according to claim 1, wherein the multi-layered pipe has been formed by co-extrusion of its layers.

8. The pipe according to claim 1, wherein the multilayer pipe comprises 3, 4, 5 or 6 layers which are each of a different material as compared to the material of each directly adjacently situated layer.

9. The pipe according to claim 1, wherein the barrier layer has a thickness which is equal to or more than 0.4 mm.

10. The pipe according to claim 1, wherein the protective layer has a thickness which is equal to or more than 0.4 mm.

11. The pipe according to claim 1, wherein the peelable layer has a thickness which is equal to or more than 0.1 mm.

12. The pipe according to claim 1, wherein the inner layer is of polyethylene (PE).

13. The pipe according to claim 1, wherein the peelable layer is sufficiently bonded to the inner layer to prevent relative movement between the peelable layer and the inner layer, and is insufficiently bonded to prevent removal of the peelable layer and therewith any layers being outer layers relative to the peelable layer, from removal by peeling.

14. The pipe according to claim 1, wherein the peelable layer is at least at the side facing the polyolefin inner layer free from any adhesives.

15. The pipe according to claim 1, wherein no material or adhesive is present between the peelable layer and the polyolefin inner layer.

16. The pipe according to claim 1, wherein the peelable layer comprises a propylene co-polymer, preferably a propylene block co-polymer.

17. The pipe according to claim 1, wherein between the protective layer and the barrier layer a tie layer of a first type is situated for bonding the protective layer against the barrier layer.

18. The pipe according to claim 17, wherein the tie layer of the first type has a thickness of about 0.1 mm.

19. The pipe according to claim 1, wherein between the peelable layer and the barrier layer a tie layer of a second type is situated for bonding the peelable layer against the barrier layer.

20. The pipe according to claim 19, wherein the tie layer of the second type has a thickness of about 0.1 mm.

21. The pipe according to claim 1, wherein the protective layer comprises PET.

22. The pipe according to claim 21, wherein the barrier layer comprises PET.

23. The pipe according to claim 22, wherein the barrier layer has a thickness which is in a range of 0.1-0.8 mm.

24. The pipe according to claim 21, wherein the protective layer has a thickness which is in the range of 0.1 mm-0.7 mm.

25. The pipe according to claim 1, wherein the protective layer and the barrier layer are together incorporated in a single layer.

26. The pipe according to claim 25, wherein the single layer has a thickness in the range of 0.2-1.5 mm.

27. A method for forming a multi-layered pipe comprising: co-extruding a polyolefin inner layer and a barrier layer to form a wall, the barrier layer being an outer layer relative to the polyolefin inner layer, the barrier layer being formed of a non-metallic barrier material, which barrier material has relative to polyolefin an enhanced resistance to diffusion therethrough of hydrocarbon molecules; co-extruding a protective layer, the protective layer being an outer layer relative to the barrier layer; and, co-extruding a peelable layer between the polyolefin inner layer and the barrier layer.

28. The method according to claim 27, further comprising using at least one die to produce multilayers.

29. The method according to claim 27, further comprising using a first die to produce two layers and using a second die oriented under an angle with respect to the two layers produced by the first die.

30. The method according to claim 27, further comprising using a first die producing two layers and using a number of second dies which are each oriented under an angle with respect to the two layers produced by the first die.

* * * * *